United States Patent
Rao et al.

(10) Patent No.: US 11,544,047 B1
(45) Date of Patent: *Jan. 3, 2023

(54) SYSTEMS AND METHODS FOR QUANTUM ALGORITHM BASED OPTIMIZATION

(71) Applicant: Wells Fargo Bank, N.A., San Francisco, CA (US)

(72) Inventors: Abhijit Rao, Irvine, CA (US); Andrew J. Garner, IV, State Road, NC (US); Adam Sanders, Huntersville, NC (US); Ramanathan Ramanathan, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,871

(22) Filed: Dec. 22, 2021

Related U.S. Application Data

(63) Continuation of application No. 16/871,894, filed on May 11, 2020, now Pat. No. 11,237,807.

(51) Int. Cl.
*G06F 8/41* (2018.01)
*G06N 20/00* (2019.01)
(Continued)

(52) U.S. Cl.
CPC ............... *G06F 8/443* (2013.01); *G06F 8/74* (2013.01); *G06F 11/3409* (2013.01); *G06N 10/00* (2019.01); *G06N 20/00* (2019.01)

(58) Field of Classification Search
CPC ........ G06F 8/443; G06F 11/3409; G06F 8/74; G06N 20/00; G06N 10/00
(Continued)

(56) References Cited

U.S. PATENT DOCUMENTS

| | | | |
|---|---|---|---|
| 10,324,741 B2 | 6/2019 | Westrelin et al. | |
| 10,592,216 B1 * | 3/2020 | Richardson | G06F 8/443 |

(Continued)

OTHER PUBLICATIONS

Reda, Sherief, Ryan Cochran, and Abdullah Nazma Nowroz. "Improved thermal tracking for processors using hard and soft sensor allocation techniques." IEEE Transactions on Computers 60.6 (2011): pp. 841-851. (Year: 2011).*

(Continued)

*Primary Examiner* — Satish Rampuria
(74) *Attorney, Agent, or Firm* — Womble Bond Dickinson (US) LLP

(57) ABSTRACT

Various methods are provided for quantum computing (QC) based code-optimization. One example method may comprise receiving an indication of one or more runtime hotspots in executed code based on one or more QC algorithms, testing a portion of the executed code associated with at least one of the one or more identified runtime hotspots; generating a plurality of performance information indicators comprising information resulting from the testing of the portion of the code; selecting, based on the plurality of performance information indicators, one QC algorithm for the at least one of the one or more identified runtime hotspots; and utilizing the selected QC algorithm for the at least one of the one or more identified runtime hotspots to optimize the at least one of the one or more identified runtime hotspots.

17 Claims, 3 Drawing Sheets

(51) Int. Cl.
  *G06F 11/34* (2006.01)
  *G06N 10/00* (2022.01)
  *G06F 8/74* (2018.01)

(58) Field of Classification Search
  USPC .................................................. 717/124–167
  See application file for complete search history.

(56) References Cited

U.S. PATENT DOCUMENTS

| | | | |
|---|---|---|---|
| 10,742,420 | B1 | 8/2020 | Griffin |
| 10,817,337 | B1* | 10/2020 | Richardson ............ G06F 9/5005 |
| 10,826,845 | B2 | 11/2020 | Dadashikelayeh et al. |
| 11,366,741 | B2* | 6/2022 | Geller ................. G06F 11/3648 |
| 2008/0189687 | A1 | 8/2008 | Levine et al. |
| 2011/0078666 | A1* | 3/2011 | Altekar ............... G06F 11/3636 |
| | | | 717/131 |
| 2017/0060623 | A1 | 3/2017 | Syrichas et al. |
| 2021/0357797 | A1* | 11/2021 | Karalekas .............. G06N 10/00 |

OTHER PUBLICATIONS

Fritzmann, Tim, Jonas Vith, and Johanna Sepulveda. "Strengthening post-quantum security for automotive systems." 2020 23rd Euromicro Conference on Digital System Design (DSD). IEEE, 2020.pp. 570-576 (Year: 2020).*

Suau, Adrien, Gabriel Staffelbach, and Aida Todri-Sanial. "qprof: a gprof-inspired quantum profiler." ACM Transactions on Quantum Computing (2021).pp. 1-29 (Year: 2021).*

Barison, Stefano, Filippo Vicentini, and Giuseppe Carleo "An efficient quantum algorithm for the time evolution of parameterized circuits." arXiv preprint arXiv:2101.04579 (2021).pp. 1-13 (Year: 2021).

Das, Poulami, et al. "A Scalable decoder micro-architecture for fault-tolerant quantum computing." arXiv preprint arXiv:2001.06598 (2020).pp. 1-19 (Year: 2020).

Ghosh, Mrityunjay, et al. "A Novel Quantum Algorithm for Ant Colony Optimization." arXiv preprint arXiv:2010.07413 (2020).pp. 1-14 (Year: 2020).

Han, Kuk-Hyun, and Jong-Hwan Kim. "Genetic quantum algorithm and its application to combinatorial optimization problem." Proceedings of the 2000 congress on evolutionary computation. CEC00 (Cat. No. 00TH8512). vol. 2. IEEE, 2000.pp. 1354-1360 (Year: 2000).

Haner, Thomas, Torsten Hoefler, and Matthias Troyer. "Assertion-based optimization of Quantum programs." Proceedings of the ACM on Programming Languages 4.OOPSLA (2020): pp. 1-20. (Year: 2020).

JavadiAbhari, AN, et al. "ScaffCC: A framework for compilation and analysis of quantum computing programs." Proceedings of the 11th ACM Conference on Computing Frontiers. 2014.pp. 1-10 (Year: 2014).

Svore, Krysta M., and Matthias Troyer. "The quantum future of computation." Computer 49.9 (2016): pp. 21-30. (Year: 2016).

U.S. Appl. No. 16/871,894, filed May 11, 2020, U.S. Pat. No. 11,237,807, Issued.

* cited by examiner

SYSTEMS AND METHODS FOR QUANTUM ALGORITHM BASED OPTIMIZATION

CROSS-REFERENCE TO RELATED APPLICATIONS

This present application is a continuation of U.S. patent application Ser. No. 16/871,894, filed May 11, 2020, titled "Systems And Methods For Quantum Algorithm Based Optimization," the contents of each are incorporated herein by reference in its entirety.

TECHNOLOGICAL FIELD

Example embodiments of the present disclosure relate generally to optimization and, more particularly, to systems and methods for quantum algorithm based optimization of code.

BACKGROUND

Although still in its infancy, quantum computing and its boundless potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Further, two or more qubits may be entangled so that their physical properties are correlated even when separated by large distances, and quantum computers may simultaneously perform a vast number of operations on these entangled qubits. This massive parallelism allows quantum computers to perform incredibly complex calculations at speeds unimaginable today and solve certain classes of problems that are beyond the capability of today's most powerful supercomputers.

Reflecting this broad potential impact, companies from a variety of market sectors are investing substantial resources to develop these promising quantum computing theories into real-world quantum computing capabilities.

BRIEF SUMMARY

Computing systems, computing apparatuses, computer-implemented methods, and computer program products are disclosed herein for using quantum computing (QC) to optimize performance of executing code in a system.

In some embodiments, a system may be provided for quantum computing (QC) based code-optimization, the system comprising: code identification circuitry configured to: identify one or more runtime hotspots in executed code based on one or more QC algorithms and application performance monitoring; code performance evaluation circuitry configured to: evaluate a performance of the one or more runtime hotspots; algorithm selection circuitry configured to: select one QC algorithm for each identified runtime hotspot of the one or more identified runtime hotspots; and code testing circuitry configured to for each identified runtime hotspot, utilize the selected QC algorithm to optimize the identified runtime hotspot.

In some embodiments, evaluating performance of the one or more runtime hotspots includes reverse engineering.

In some embodiments, evaluating the performance of the one or more runtime hotspots includes comparing performance of the one or more runtime hotspots to one or more QC algorithms.

In some embodiments, the algorithm selection circuitry is further configured to receive a catalog of QC algorithms and associated performance information.

In some embodiments, the code performance evaluation circuitry is further configured to evaluate each of the optimized identified runtime hotspot to generate performance information of each of the optimized identified runtime hotspot.

In some embodiments, the code identification circuitry is further configured to receive the performance information of each of the optimized identified runtime hotspot to further identify runtime hotspots.

In some embodiments, a method may be provided for quantum computing (QC) based code-optimization, the method comprising: identifying one or more runtime hotspots in executed code based on one or more QC algorithms and application performance monitoring; evaluating performance of the one or more runtime hotspots; selecting one QC algorithm for each identified runtime hotspot of the one or more identified runtime hotspots; and for each identified runtime hotspot, testing the selected QC algorithm to optimize the identified runtime hotspot.

In some embodiments, evaluating performance of the one or more runtime hotspots includes reverse engineering.

In some embodiments, evaluating performance of the one or more runtime hotspots includes comparing performance of the one or more runtime hotspots to one or more QC algorithms.

In some embodiments, the method may further comprise receiving a catalog of QC algorithms and associated performance information.

In some embodiments, the method may further comprise evaluating each of the optimized identified runtime hotspot to generate performance information of each of the optimized identified runtime hotspot.

In some embodiments, the method may further comprise receiving the performance information of each of the optimized identified runtime hotspot to further identify runtime hotspots.

In some embodiments, a computer program product may be provided for quantum computing (QC) based code-optimization, the computer program product comprising at least one non-transitory computer-readable storage medium storing program instructions that, when executed, cause a system to: identify one or more runtime hotspots in executed code based on one or more QC algorithms and application performance monitoring; evaluate performance of the one or more runtime hotspots; select one QC algorithm for each identified runtime hotspot of the one or more identified runtime hotspots; and for each identified runtime hotspot, test the selected QC algorithm to optimize the identified runtime hotspot.

In some embodiments, evaluating performance of the one or more runtime hotspots includes reverse engineering.

In some embodiments, evaluating performance of the one or more runtime hotspots includes comparing performance of the one or more runtime hotspots to one or more QC algorithms.

In some embodiments, the program instructions, when executed, further cause the system to receive a catalog of QC algorithms and associated performance information.

In some embodiments, the program instructions, when executed, further cause the system to evaluate each of the optimized identified runtime hotspot to generate performance information of each of the optimized identified runtime hotspot.

In some embodiments, the program instructions, when executed, further cause the system to receive the performance information of each of the optimized identified runtime hotspot to further identify runtime hotspots.

In some embodiments, the performance information includes one or more of: a processing time, a central processing unit utilization, or a memory utilization.

In some embodiments, the one or more QC algorithms include one or more of: a Quadratic Unconstrained Binary Optimization algorithm, a Quantum Approximate Optimization algorithm, a Quantum Machine Learning algorithm, a Quantum Geometrodynamics algorithm, or a Quantum Monte Carlo algorithm.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
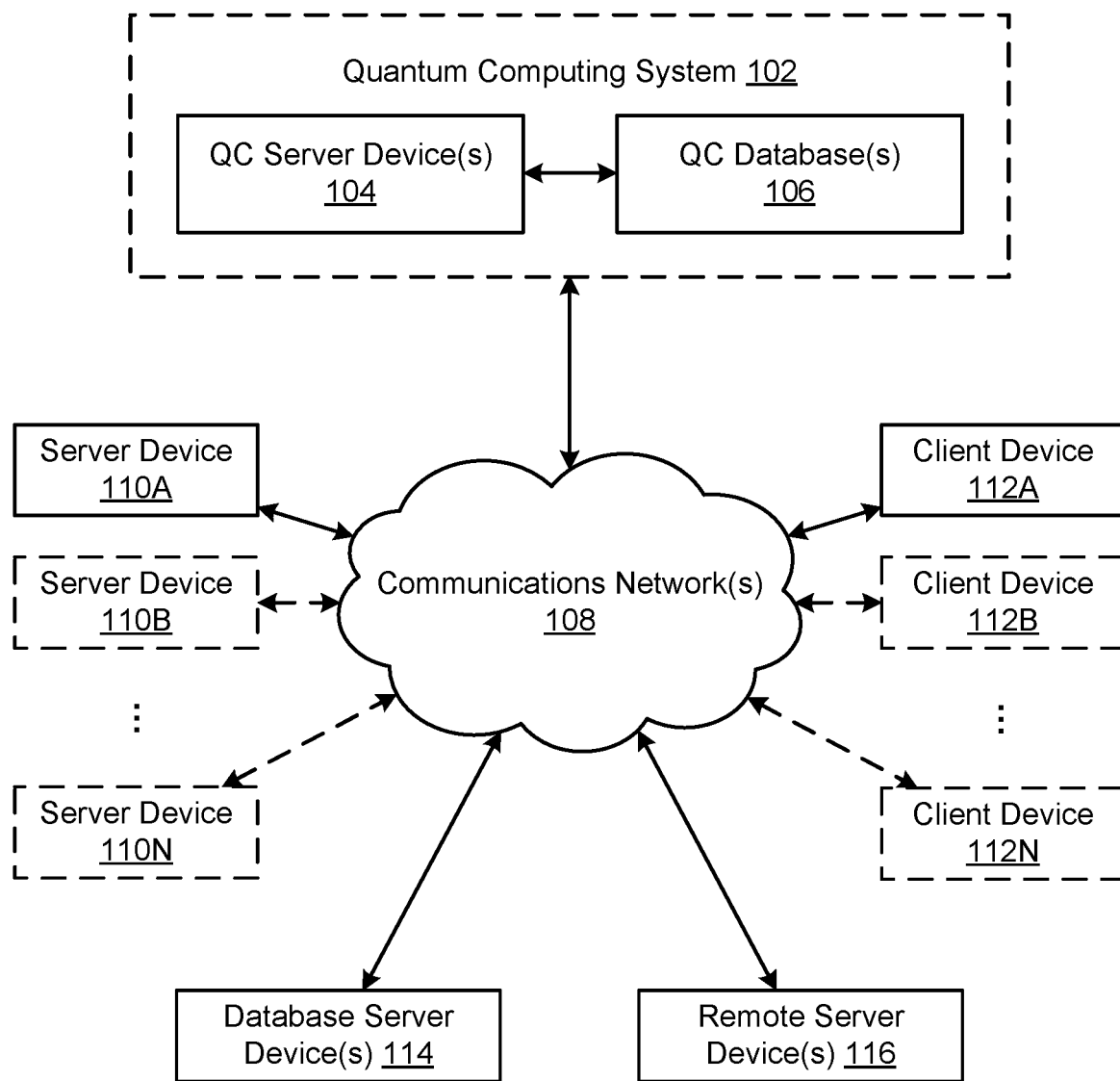
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that for using quantum computing (QC) to optimize performance of executing code in a system. In some embodiments, the performance of identified portions (e.g., runtime hotspots and targeted portions) of code are being optimized using QC. QC and application performance monitoring (APM) may be used to identify runtime hotspots and targeted portions of code for optimization using a QC algorithm, for example, Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like, executed on a particular QC machine (e.g., quantum annealer, circuit-based quantum processor, or the like).

Example embodiments may select the particular QC algorithm and QC machine for optimizing each identified portions (e.g., runtime hotspots and targeted portions). For example, example embodiments may run quantum optimization on the identified runtime hotspots to determine which hotspots are best for optimization using a particular QC algorithm and QC machine (e.g., use a quantum annealer and related algorithm on a first portion of code, use a circuit-based quantum processor and related algorithm on a second portion of code). In another example, example embodiments may test the code on different QC algorithms and QC machines to generate a matrix of QC performance information for use in selecting the optimal QC algorithm and QC machine for each identified runtime hotspot. In yet another example, example embodiments may determine what is the best path in the sequence for QC and use a combination of different QC algorithms and QC machines for that path.

The code being optimized may be code for different applications. For example, the code may be code related to portfolio optimization. Investment portfolios typically include numerous assets, financial products, etc. of all types. Furthermore, these investment portfolios are designed to achieve set goals (e.g., a targeted rate of return) at a set budget level while also minimizing risk. Given the number of variables that may be considered (e.g., types of asset, budget constraints, holding time, risk tolerance, etc.), the extensive number of assets held in a portfolio, and the ever-changing state of the market as well as its effect on each of the assets, financial modeling and optimization algorithms are often used to be optimize the character of a portfolio (e.g., number and type of assets held). By way of example, a portfolio may be concerned with maximizing returns while also minimizing risk. As is evident by the number and/or types of assets in a portfolio, the number of simulations and calculations that must occur, for example, for each potential permutation of the portfolio's assets in order to optimize performance of the portfolio may exceed the capability of conventional computing.

Some attempts directed at accomplishing these calculations have relied upon machine learning and other dynamic programming techniques (e.g., reinforcement learning) to train a model that maximizes cumulative reward (e.g., maximizing return). Emerging computing technology in the space of Quantum Computing further illustrate promise due to their ability to perform a significant number of complex calculations in a shorter time period than traditional computers. Furthermore, the randomly deterministic nature of quantum computing matches the goal of portfolio optimization in which outcomes and performance of a particular portfolio are evaluated under a large number of randomly generated scenarios.

In another example, the code being optimized may be code related to post-quantum cryptography (PQC). Traditionally, data owners and third-party hosting services use hybrid cryptosystems to safeguard the confidentiality, integrity, and authenticity of enormous volumes of protected data and complex IT systems. These hybrid cryptosystems typically use a combination of asymmetric cryptography (e.g., public key cryptography), such as the Rivest-Shamir-Adleman (RSA) cryptosystem, and symmetric cryptography (e.g., secret key cryptography), such as the Advanced Encryption Standard (AES). One example of a modern hybrid cryptosystem is the Transport Layer Security (TLS) protocol, which relies on asymmetric cryptography for authentication and key management to establish session keys, and symmetric cryptography for session encryption and integrity validation.

However, these cryptosystems are vulnerable to quantum algorithms implemented on quantum computers. For instance, asymmetric encryption, key exchange, and digital signature rely on mathematical problems such as the integer factorization problem (e.g., as used in RSA) and the discrete logarithm problem (e.g., as used in Digital Signature Algorithm (DSA), Elliptic Curve DSA (ECDSA), Diffie-Hellman (DH), and Elliptic Curve DH (ECDH)). It is widely believed that a large-scale fault tolerant quantum computer could effectively break modern public key cryptosystems by solving instances of the integer factorization problem and the discrete logarithm problem quickly enough that keys reverse engineered based on those solutions would still be valid.

In one illustrative example, a quantum computer implementing Shor's algorithm could determine the private keys used for current public-key systems in a relatively short time because Shor's algorithm provides a faster cryptanalysis method for solving integer factorization than a brute force method (e.g., guessing prime numbers). For instance, Shor's algorithm uses the quantum Fourier transform (QFT) instead of its slower classical counterpart, the fast Fourier transform (FFT). Further, Shor's algorithm can be modified to compute discrete logarithms, including discrete logarithms used for elliptic-curve cryptography (ECC).

In another illustrative example, a quantum computer implementing Grover's algorithm could effectively perform an exhaustive key search because Grover's algorithm provides quadratic speedup and thereby could brute-force attack an N-bit symmetric cryptographic key in only about $2^{(N/2)}$ iterations. In some instances, for symmetric cryptographic techniques that support a doubled key length (e.g., AES supports doubling a 128-bit key to 256 bits), doubling the key length of the symmetric cryptographic key may provide sufficient protection against Grover's algorithm because a brute-force attack on a 2N-bit symmetric cryptographic key would require about $2^N$ iterations. For example, a 256-bit symmetric cryptographic key (e.g., AES-256) may only provide 128 bits of security in a quantum computing environment. However, any migration plan that involves doubling the key length of the symmetric cryptographic key must also evaluate the impact of the doubled key length on the performance of related applications and the additional requirements of computational resources.

Although quantum computers capable of such feats are still believed to be several years away, the threat of a "harvest now and decrypt later attack" makes quantum computing an immediate real threat, even if the threat will not be actionable until a sufficiently robust quantum computer is developed in the future. The "harvest now and decrypt later attack" is a long-game attack where a bad actor scrapes, collects, or harvests (e.g., records and stores) encrypted data, such as data streaming through the Internet or cloud, by the way of breaches or passive interception and then hoard the encrypted data, waiting for the day when quantum computers can determine the cryptographic keys to the harvested data. This bad actor could be storing data to or from a specific website, server, email client, or other target of attack or, given sufficient motivation and resources, recording petabytes of data each hour from general internet traffic. Once quantum computers are capable of determining the cryptographic keys associated with the harvested encrypted data, the bad actor might use those cryptographic keys to decrypt the previously encrypted data. For instance, persistent data, such as mortgage information and financial records, encrypted or digitally signed with today's cryptographic algorithms will be at risk even if the necessary quantum computing technology is not available for seven to ten years or even later. Subsequently, with advancements in artificial intelligence and machine learning and the exponential increase in data processing compute power, a bad actor could attack a data vault to extract meaningful information from the decrypted petabytes of data. The code may be related to providing post-quantum cryptography (PQC) that mitigates the vulnerability of traditional cryptographic algorithms by providing techniques for migrating enormous volumes of data and complex IT systems to PQC technologies and platforms that are not vulnerable to attack by a quantum computer.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "quantum basis" refers to sets of orthogonal quantum states, including, but not limited to, pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state $|0\rangle$ and the vertical photon polarization state $|1\rangle$. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state $|L\rangle$ and the right circular photon polarization state $|R\rangle$.

The term "quantum particle" refers to photons, atoms, electrons, molecules, ions, or other suitable particles or quasi-particles (e.g., composite fermions). The term "entangled quantum particle" refers to two or more photons, atoms, electrons, molecules, ions, or other suitable particles or quasi-particles entangled according to the principles of quantum entanglement.

The term "qubit" refers to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state $|1\rangle$ and the spin down state $|0\rangle$); the energy level of a single atom (e.g., a superconducting qubit); the Hall conductance of electron systems (e.g., qubits based on a quantum Hall effect, such as an integer quantum Hall effect, a fractional quantum Hall effect, or a quantum spin Hall effect); the vibration state of a single carbon nanotube or nanoparticle (e.g., a carbon qubit, a carbon nanotube or nanoparticle coupled to a spin qubit, a carbon nanotube or nanoparticle coupled to a superconducting qubit); the electronic state of an ion (e.g., a trapped ion); a transmission line shunted plasma oscillation qubit (e.g., a fixed-frequency transmon qubit, a frequency-tunable transmon qubit); a charge qubit (e.g., a superconducting charge qubit); a defect (e.g., a vacancy, a dopant, or a combination thereof, such as a nitrogen-vacancy center or a silicon-vacancy center) in a diamond structure (e.g., a diamond qubit); or any other suitable qubit. Qubits may exist in multiple states simultaneously and can be made of any suitable quantum particle, including entangled quantum particles. Qubits may exist in multiple states simultaneously and may be made of quantum particles such as photons, atoms, electrons, molecules, ions, or other suitable particles, such as quasi-particles. In some embodiments, qubits may be entangled according to the principles of quantum entanglement. For example, a pair of entangled qubits may comprise a first entangled qubit and a second entangled qubit, where measurement of the first entangled qubit causes the collapse of the second entangled qubit such that the first entangled qubit and the second entangled qubit are equal (e.g., both "0" or both "1") when measured using the same quantum basis.

The term "optical line" refers to an optical communications path. For example, an optical line may comprise an optical fiber, an optical waveguide, a fiberoptic cable, a non-polarization maintaining optical fiber, an optical transmission line, a quantum line, or a combination thereof. The term optical line broadly encompasses on-chip optical lines.

The term "quantum line" refers to a quantum communications path. For example, a quantum line may comprise a polarization-maintaining (PM) optical fiber (PMF or PM fiber), photonic transmission lines, photonic crystals, photonic circuitry, free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible. The term optical line broadly encompasses on-chip quantum lines.

The term "on-chip encoder" and "on-chip decoder" is used herein to refer to any device that respectively encodes or decodes a qubit of information, or in time-bins of information, on a photon or an electron. In this regard, the qubit decoder may comprise an optoelectronic device as described below.

The terms "optoelectronic device," "optoelectronic component," "laser device," "light source," "single photon source," "particle source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. Each of the MZIs disclosed herein may comprise a combination of mirrors, beam splitters, photodetectors, fiberoptic cables, lenses, nonlinear crystals, wave plates, motors (e.g., servo motors), motion controllers (e.g., servo motor controllers), temperature controllers (e.g., thermoelectric devices), and any other suitable components arranged to perform the operations and functions disclosed herein, including, but not limited to, the controlling of optical path length. In some embodiments, a first optoelectronic device may include a particle source configured to generate single particles (e.g., photons or electrons) and transmit the generated particles through a double-slit structure to a first electron detector (e.g., "|1>") and a second electron detector (e.g., "|0>") as described herein.

The term "run-time hotspot" refers to a portion of code (i.e., program instructions that, when executed, cause a system to perform certain functions) previously executed, being executed, or to be executed.

The term "real-time purchase data" refers to data representing a real-time purchase of a collateral, such as holdings, including options, future, bonds. Real-time purchase data may be initially generated at a client device then later transmitted to a QC system.

The term "real-time sell data" refers to data representing a real-time sell of a collateral, such as holdings, including options, future, bonds. Real-time sell data may be generated at a client device then later transmitted to a QC system.

The term "collateral expiration data" refers to data representing expiration of collaterals, such as triple witching of stock or other pre-defined expiration of collaterals. Collateral expiration data may be generated at a client device then later transmitted to a QC system.

The term "portfolio optimization factor data" refers to data representing factors that may be used for optimizing a portfolio's profitability such as: world economy data representing any factors that may impact world economy, life event data representing any personal life event associated with a customer associated with the portfolio, personal portfolio factor data representing customer-defined personal preference on managing a portfolio, personal portfolio constraints data representing customer-defined constraints, or the like. A QC system may filter portfolio optimization factor data to generate filtered portfolio optimization factor data and use the filtered portfolio optimization factor data to optimize the portfolio. The QC system may also use one or more sets of portfolio optimization factor data or filtered portfolio optimization factor data in testing simulations of portfolio, such as CVAR (conditional value at risk) or CCAR (comprehensive capital analysis and review) testing simulations.

The term "testing simulations" refers to stress testing simulations for risk levels, such as CVAR testing or CCAR testing. In some embodiment, the QC system may perform testing simulations iteratively or simultaneously on a periodic or on demand basis using one or more QC algorithms.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more networked devices, such as one or more servers, remote servers, cloud-based servers (e.g., cloud utilities), or other network entities, and configured to communicate with one or more devices, such as one or more server devices, client devices, database server devices, remote server devices, other suitable devices, or a combination thereof.

In some instances, the method, system, apparatus, and computer program product of an example embodiment may be embodied by one or more quantum communications circuitries, such as one or more quantum particle encoders, quantum particle decoders, laser devices, quantum lines, quantum particle storage devices, other suitable quantum communications devices or components, or a combination thereof.

Example embodiments of the client devices include any of a variety of stationary or mobile computing devices, such as a mobile telephone, smartphone, smartwatch, smart speaker, portable digital assistant (PDA), tablet computer, laptop computer, desktop computer, kiosk computer, automated teller machine (ATM), point of sale (PoS) device, electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide portfolio optimization. As illustrated, a QC system 102 may be connected to one or more QC server devices 104 in communication with one or more QC databases 106. The QC system 102 may be connected to one or more server devices 110A-110N, one or more client devices 112A-112N, one or more database server devices 114, and one or more remote server devices 116 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the QC system 102 may be configured to provide portfolio optimization as described in further detail below.

The QC system 102 may be embodied as one or more specialized circuitries, computers, or computing systems and may comprise one or more QC server devices 104 and one or more QC databases 106. The one or more QC server devices 104 may be embodied as one or more servers, remote servers, cloud-based servers (e.g., cloud utilities), processors, any other suitable server devices, or any combination thereof. The one or more QC server devices 104 may be configured to receive, process, generate, and transmit data, signals, and electronic information to facilitate the operations of the QC system 102. The one or more QC databases 106 may be embodied as one or more data storage devices, such as Network Attached Storage (NAS) devices or separate databases or servers. The one or more QC databases 106 may be configured to store and provide access to data and information used by the QC system 102 to facilitate the operations of the QC system 102. For example, the one or more QC databases 106 may store user account credentials for users of one or more server devices 110A-110N, one or more client devices 112A-112N, one or more database server devices 114, one or more remote server devices 116, or a combination thereof. In another example, the one or more QC databases 106 may store data regarding device characteristics for the one or more server devices 110A-110N, one or more client devices 112A-112N, one or more database server devices 114, one or more remote server devices 116, or a combination thereof. In some embodiments, the one or more QC server devices 104, the one or more QC databases 106, or both may include or store various data and electronic information associated with one or more data, data attributes, data envelopes, enveloped data structures, portfolio data, collateral data, risk level data, time data, policy information, real-time purchase data, real-time sell data, collateral expiration data, portfolio optimization factor data, life event data, personal portfolio factor data, machine learning model, non-QC algorithms, non-QC algorithm performance information, QC algorithm performance information, QC algorithms, other machine learning techniques, graphical user interface (GUI) data, any other suitable data or electronic information, any links or pointers thereto, or combinations thereof. In some embodiments, the one or more QC server devices 104, the one or more QC databases 106, or both may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more server devices 110A-110N may be embodied by one or more computing devices. In some embodiments, the one or more server devices 110A-110N may be embodied as one or more servers, remote servers, cloud-based servers (e.g., cloud utilities), processors, or any other suitable devices, or any combination thereof. In some embodiments, the one or more server devices 110A-110N may receive, process, generate, and transmit data, signals, and electronic information to facilitate the operations of the QC system 102. Information received by the QC system 102 from one or more server devices 110A-110N may be provided in various forms and via various methods. In some embodiments, the one or more server devices 110A-110N may include or store various data and electronic information associated with one or more data, data attributes, data envelopes, enveloped data structures, portfolio data, collateral data, risk level data, time data, policy information, real-time purchase data, real-time sell data, collateral expiration data, portfolio optimization factor data, life event data, personal portfolio factor data, real-time purchase data, real-time sell data, collateral expiration data, portfolio optimization factor data, life event data, personal portfolio factor data, personal portfolio constraints data, machine learning techniques, GUI data, any other suitable data or electronic information, any links or pointers thereto, or combinations thereof. In some embodiments, the one or more server devices 110A-110N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more client devices 112A-112N may be embodied by one or more computing devices. Information received by the QC system 102 from the one or more client devices 112A-112N may be provided in various forms and via various methods. For example, the one or more client devices 112A-112N may be smartphones, laptop computers, netbooks, tablet computers, wearable devices, desktop computers, ATMs, PoS devices, electronic workstations, or the like, and the information may be provided through various modes of data transmission provided by these client devices. In some embodiments, the one or more client devices 112A-112N may include or store various data and electronic information associated with one or more users. For example, the one or more client devices 112A-112N may include or store user information (including, but not limited to, user profile information), any other suitable data, or any combination thereof. In some embodiments, the one or more client devices 112A-112N may include or store various data and electronic information associated with one or more data, data attributes, data envelopes, enveloped data structures, portfolio data, collateral data, risk level data, time data, policy information, real-time purchase data, real-time sell data, collateral expiration data, portfolio optimization factor data, life event data, personal portfolio factor data, real-time purchase data, real-time sell data, collateral expiration data, portfolio optimization factor data, life event data, personal portfolio factor data, personal portfolio constraints data, machine learning techniques, GUI data, any other suitable data or electronic information, any links or pointers thereto, or combinations thereof. In some embodiments, the one or more client devices 112A-112N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In embodiments where a client device 112 is a mobile device, such as a smartphone or tablet, the mobile device may execute an "app" (e.g., a thin-client application) to interact with the QC system 102, one or more server devices 110A-110N, one or more database server devices 114, one or more remote server devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, database server devices, remote server devices). Communication with hardware and software modules executing outside of the app is typically provided via APIs provided by the mobile device operating system.

The one or more database server devices 114 may be embodied by one or more computing devices, server devices, servers, data storage devices, databases, or a combination thereof. In some embodiments, the one or more database server devices 114 may be embodied as one or more data storage devices, such as one or more NAS devices, or as one or more separate databases or database servers. In some embodiments, the one or more database server devices 114 may be embodied as one or more servers, remote servers, cloud-based servers (e.g., cloud utilities), processors, or any other suitable devices, or any combination thereof. In some embodiments, the one or more database server devices 114 may receive, process, generate, and transmit data, signals, and electronic information to facilitate the operations of the QC system 102. Information received by the QC system 102 from one or more database server devices 114 may be provided in various forms and via various methods. It will be understood, however, that in some embodiments, the one or more database server devices 114 need not themselves be databases or database servers but may be peripheral devices communicatively coupled to databases or database servers.

In some embodiments, the one or more database server devices 114 may include or store various data and electronic information associated with one or more data, data attributes, data envelopes, enveloped data structures, portfolio data, collateral data, risk level data, time data, policy information, real-time purchase data, real-time sell data, collateral expiration data, portfolio optimization factor data, life event data, personal portfolio factor data, real-time purchase data, real-time sell data, collateral expiration data, portfolio optimization factor data, life event data, personal portfolio factor data, personal portfolio constraints data, machine learning techniques, GUI data, any other suitable data or electronic information, any links or pointers thereto, or combinations thereof. In some embodiments, the one or more database server devices 114 may include or store exogenous data. The exogenous data may comprise, for example, public sentiment data structures (e.g., a widespread data breach at a third-party system, such as a merchant; a stock market crash; a geopolitical event), news articles, FDIC data, NIST data, company intranet data, technological advancements, scientific publications, financial data (e.g., stock market data, commodity market data, money market data), legal data (e.g., lawsuit data, regulatory data), any other suitable exogenous data, or any combination thereof. In some embodiments, the one or more database server devices 114 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more remote server devices 116 may be embodied by one or more computing devices, server devices, servers, data storage devices, databases, or a combination thereof. In some embodiments, the one or more remote server devices 116 may be embodied as one or more data storage devices, such as one or more NAS devices, or as one or more separate databases or database servers. In some embodiments, the one or more remote server devices 116 may be embodied as one or more servers, remote servers, cloud-based servers (e.g., cloud utilities), processors, or any other suitable devices, or any combination thereof. In some embodiments, the one or more remote server devices 116 may receive, process, generate, and transmit data, signals, and electronic information to facilitate the operations of the QC system 102. Information received by the QC system 102 from one or more remote server devices 116 may be provided in various forms and via various methods. It will be understood, however, that in some embodiments, the one or more remote server devices 116 need not themselves be servers but may be peripheral devices communicatively coupled to servers.

In some embodiments, the one or more remote server devices 116 may include or store various data and electronic information associated with one or more data, data attributes, data envelopes, enveloped data structures, portfolio data, collateral data, risk level data, time data, policy information, real-time purchase data, real-time sell data, collateral expiration data, portfolio optimization factor data, life event data, personal portfolio factor data, real-time purchase data, real-time sell data, collateral expiration data, portfolio optimization factor data, life event data, personal portfolio factor data, personal portfolio constraints data, machine learning techniques, GUI data, exogenous data, any other suitable data or electronic information, any links or pointers thereto, or combinations thereof. In some embodiments, the one or more remote server devices 116 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In some embodiments, the one or more server devices 110A-110N, the one or more client devices 112A-112N, the one or more database server devices 114, the one or more remote server devices 116, or any combination thereof may interact with the QC system 102 over one or more communications networks 108. As yet another example, the one or more server devices 110A-110N, the one or more client devices 112A-112N, the one or more database server devices 114, the one or more remote server devices 116, or a combination thereof may include various hardware or firmware designed to interface with the QC system 102. For example, an example server device 110A may be a session authentication server modified to communicate with the QC system 102, and another example server device 110B may be a purpose-built session authentication server offered for the primary purpose of communicating with the QC system 102. As another example, an example client device 112A may be a user's smartphone and may have an application stored thereon facilitating communication with the QC system 102, whereas another example client device 112B may be a purpose-built device offered for the primary purpose of communicating with the QC system 102.

In some embodiments, the one or more server devices 110A-110N, the one or more client devices 112A-112N, the one or more database server devices 114, the one or more remote server devices 116, or any combination thereof may interact with the QC system 102 over one or more PQC communications channels. The PQC communications channel may be, for example, a communications channel over which data is transmitted and received using a PQC cryptographic technique, such as a PQC back channel (e.g., a PQC out-of-band communications channel).

As a foundation for some embodiments, the QC system 102 may provide for receiving data and generating a set of data attributes about the data. In some embodiments, the QC system 102 may provide for receiving, directly or indirectly via communications network 108, the data from one or more of the one or more client devices 112A-112N, the one or more server devices 110A-110N, the one or more database server devices 114, any other suitable device, or any combination thereof. In some embodiments, the QC system 102 may further provide for generating a data envelope based on the set of data attributes. In some embodiments, the QC system 102 may further provide for generating an enveloped data structure based on the data envelope and the data.

In some embodiments, the QC system may communicate with one or more of the one or more client devices 112A-112N, the one or more server devices 110A-110N, the one or more database server devices 114, the one or more remote server devices 116, any other suitable device, or any combination thereof.

In some embodiments, the QC system 102 may further provide for generating a portfolio view (e.g., GUI) for enabling customer input of life event data representing any personal life event associated with a customer associated with the portfolio, personal portfolio factor data representing customer-defined personal preference on managing a portfolio, personal portfolio constraints data representing customer-defined constraints, or the like.

Example Implementing Apparatuses

The QC system 102 described with reference to FIG. 1 may be embodied by one or more computing systems, such as apparatus 200 shown in FIG. 2. In some embodiments, apparatus 200 shown in FIG. 2 may represent an example QC system 102, a QC server device 104, a QC database, or a combination thereof.

Figure 2:
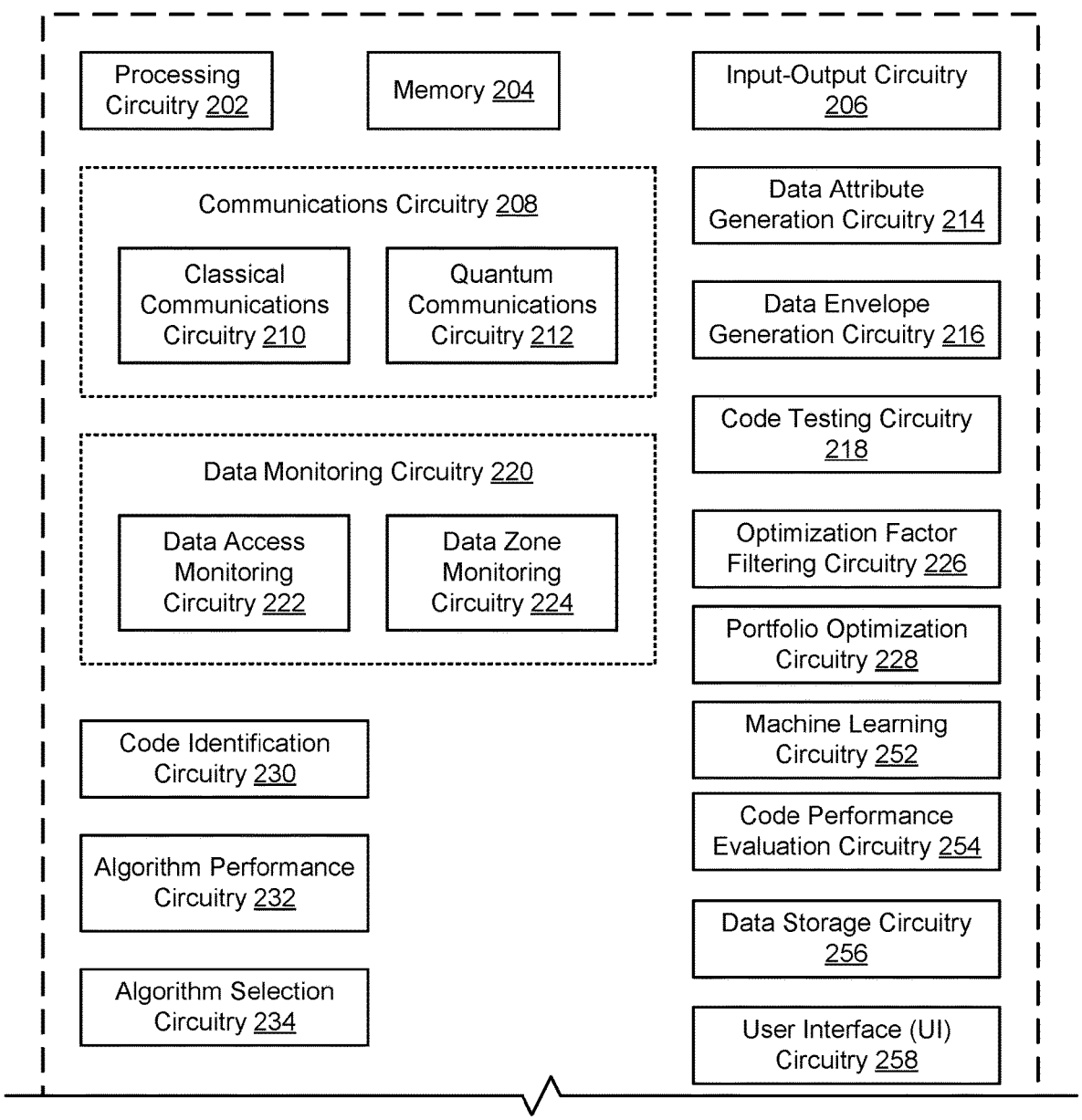
FIG. 2 illustrates a schematic block diagram of example circuitries that may perform various operations in accordance with some example embodiments described herein.

As illustrated in FIG. 2, the apparatus 200 may include one or more of processing circuitry 202, memory 204, input-output circuitry 206, communications circuitry 208 (including, but not limited to, classical communications circuitry 210 and quantum communications circuitry 212), data attribute generation circuitry 214, data envelope generation circuitry 216, code testing circuitry 218, data monitoring circuitry 220 (including, but not limited to, data access monitoring circuitry 222 and data zone monitoring circuitry 224), optimization factor filtering circuitry 226, portfolio optimization circuitry 228, code identification circuitry 230, algorithm performance circuitry 232, algorithm selection circuitry 234, machine learning circuitry 252, code performance evaluation circuitry 254, data storage circuitry 256, user interface (UI) circuitry 258, any other suitable circuitry, or any combination thereof. The apparatus 200 may be configured to execute the operations described above with respect to FIG. 1 and below with respect to FIG. 3.

In some embodiments, the processing circuitry 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. For example, the memory may be an electronic storage device (e.g., a computer readable storage medium). The memory 204 may be configured to store information, data, data structures, content, control signals, applications, instructions, or the like, for enabling the apparatus to carry out various functions in accordance with example embodiments of the present disclosure. In some instances, the memory 204 may be configured to store data, data structures, data elements, and electronic information associated with one or more data, data attributes, data envelopes, enveloped data structures, portfolio data, collateral data, risk level data, time data, policy information, real-time purchase data, real-time sell data, collateral expiration data, portfolio optimization factor data, life event data, personal portfolio factor data, machine learning model, non-QC algorithms, non-QC algorithm performance information, QC algorithm performance information, QC algorithms, other machine learning techniques, graphical user interface (GUI) data, any other suitable data or electronic information, or combinations thereof. It will be understood that the memory 204 may be configured to store any data, data structures, electronic information, requests, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally, or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processor. Alternatively, or additionally, the processing circuitry 202 may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the functionalities and operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface (e.g., a user interface generated by user interface circuitry included in the apparatus 200) comprising a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202, the input-output circuitry 206 (which may utilize the processing circuitry 202), or both may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may be configured to generate (e.g., by UI circuitry 258) user interface data (e.g., data attribute GUI data, risk profile GUI data, PQC optimization GUI data, data monitoring GUI data) for display by one or more other devices with which one or more users directly interact and transmit the generated user interface data to one or more of those devices.

The communications circuitry 208 may be any device or circuitry embodied in either hardware or a combination of hardware and software that is configured to receive and/or transmit classical data, quantum information, or both from or to a network and/or any other device, circuitry, or module in communication with the apparatus 200. In this regard, the communications circuitry 208 may include, for example, classical communications circuitry 210 and quantum communications circuitry 212.

The classical communications circuitry 210 may be any device or circuitry embodied in either hardware or a combination of hardware and software that is configured to receive and/or transmit data from or to a network and/or any other device, circuitry, or module in communication with the apparatus 200. In this regard, the classical communications circuitry 210 may include, for example, a network interface for enabling communications with a wired or wireless communications network. For example, the classical communications circuitry 210 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum communications circuitry 212 may be any device or circuitry embodied in either hardware or a combination of hardware and software that is configured to receive and/or transmit quantum particles, such as photons, electrons, or both from or to any other device, circuitry, or module in communication with the apparatus 200. In this regard, the quantum communications circuitry 212 may include, for example, optical components such as an optical communications interface for enabling optical communications over a quantum line. In some embodiments, the quantum communications circuitry 212 may include encoding circuitry (e.g. an on-chip encoder) to generate a set of entangled quantum particles (e.g., qubits, qutrits, qudits) and decoding circuitry (e.g., an on-chip decoder) to receive (e.g., directly or indirectly, such as via switching circuitry), store, and measure a set of entangled quantum particles. In some embodiments, the quantum communications circuitry 212 may further include quantum basis determination circuitry configured to determine the quantum bases, or sets of quantum bases, for encoding and decoding of a given set of quantum particles. In some embodiments, the quantum communications circuitry 212 may include or be communicatively coupled to one or more quantum storage devices configured to store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, and combinations thereof.

In some embodiments, the communications circuitry 208 may be configured to receive, retrieve, or obtain data. In some embodiments, the data may comprise data access control information, a link or pointer to the data (e.g., a link to a credit card number), a bitstream, a binary large object (BLOB), any other suitable data, or any combination thereof. In some embodiments, the data may have been encrypted based on a set of encryption attributes, such as a set of non-PQC encryption attributes, a set of PQC encryption attributes, or both (e.g., double encryption where the data has been encrypted based on a set of non-PQC encryption attributes and then double encrypted based on a set of PQC encryption attributes). In some embodiments, the communications circuitry 208 may be configured to receive, retrieve, or obtain the data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain a set of data attributes about the data. In some embodiments, the communications circuitry 208 may be configured to receive, retrieve, or obtain the set of data attributes from another circuitry, such as processing circuitry 202, data attribute generation circuitry 214, any other suitable circuitry, or a combination thereof. In some embodiments, the communications circuitry 208 may be configured to receive, retrieve, or obtain the set of data attributes from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the set of data attributes, the communications circuitry 208 may be configured to receive, retrieve, or obtain the set of data attributes by extracting the set of data attributes from the data envelope.

In some embodiments, the communications circuitry 208 may be configured to receive, retrieve, or obtain policy information associated with the data. In some embodiments, the communications circuitry 208 may be configured to receive, retrieve, or obtain the policy information from another circuitry, such as processing circuitry 202, policy attribute generation circuitry 226, any other suitable circuitry, or a combination thereof. In some embodiments, the communications circuitry 208 may be configured to receive, retrieve, or obtain the policy information from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain real-time purchase data, real-time sale data, life event data, or personal portfolio factor data. In some embodiments, the communications circuitry 208 may be configured to receive, retrieve, or obtain the real-time purchase data, real-time sale data, life event data, or personal portfolio factor data from another circuitry, such as processing circuitry 202, UI circuitry 258, any other suitable circuitry, or a combination thereof. In some embodiments, the communications circuitry 208 may be configured to receive, retrieve, or obtain the real-time purchase data, real-time sale data, life event data, or personal portfolio factor data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the real-time purchase data, real-time sale data, life event data, or personal portfolio factor data, the communications circuitry 208 may be configured to receive, retrieve, or obtain the real-time purchase data, real-time sale data, life event data, or personal portfolio factor data by extracting the real-time purchase data, real-time sale data, life event data, or personal portfolio factor data from the data envelope.

In some embodiments, the communications circuitry 208 may be configured to receive, retrieve, or obtain collateral expiration data and portfolio optimization factor data. In some embodiments, the communications circuitry 208 may be configured to receive, retrieve, or obtain the collateral expiration data and portfolio optimization factor data from another circuitry, such as processing circuitry 202, input-output circuitry 206, UI circuitry 258, any other suitable circuitry, or a combination thereof. In some embodiments, the communications circuitry 208 may be configured to receive, retrieve, or obtain the collateral expiration data and portfolio optimization factor data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain QC algorithm performance information associated with a set of QC algorithms. In some embodiments, the communications circuitry 208 may be configured to receive, retrieve, or obtain the QC algorithm performance information from another circuitry, such as processing circuitry 202, algorithm performance circuitry 234, any other suitable circuitry, or a combination thereof. In some embodiments, the communications circuitry 208 may be configured to receive, retrieve, or obtain the QC algorithm performance information from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

The data attribute generation circuitry 214 includes hardware components designed or configured to request, receive, process, generate, and transmit data, data structures, control signals, and electronic information for use in PQC. In some embodiments, the data attribute generation circuitry 214 may be configured to generate a set of data attributes about data, such as the data received by the communications circuitry 208, based on the data. In some embodiments, the data attribute generation circuitry 214 may be configured to generate the set of data attributes about the data based on the data itself, overhead data (e.g., protocol overhead, header, metadata) associated with the data, any other suitable data or electronic information, or any combination thereof. In some embodiments, the data attribute generation circuitry 214 may be configured to generate the set of data attributes about the data based on a machine learning technique, such as a machine learning technique provided or performed by the code performance evaluation circuitry 254.

In some embodiments, the set of data attributes about the data may comprise a data lineage data attribute indicative of a data lineage of the data. For example, the data attribute generation circuitry 214 may be configured to generate a data lineage data attribute indicative of a data lineage of the data, wherein the set of data attributes comprises the data lineage data attribute.

In some embodiments, the set of data attributes about the data may comprise a cryptographic data attribute indicative of a cryptographic technique used to encrypt the data. In some instances, the data attribute generation circuitry 214 may be configured to generate, without user interactivity, the cryptographic data attribute based on an automated analysis of a bitstream of the data. For example, the data may comprise a bitstream, and the data attribute generation circuitry 214 may be configured to generate, based on an automated analysis of the bitstream and without user interactivity, a cryptographic data attribute indicative of a cryptographic technique used to encrypt the data, wherein the set of data attributes comprises the cryptographic data attribute.

In some embodiments, the set of data attributes about the data may comprise a cryptographic spawn log indicative of a set of cryptographic techniques used to encrypt the data. For example, the data attribute generation circuitry 214 may be configured to generate a cryptographic spawn log comprising a set of timestamps and information indicative of sets of PQC encryption attributes used to encrypt the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the data attribute generation circuitry 214 may be configured to generate a cryptographic spawn log comprising a set of encryption identification numbers and information indicative of sets of PQC encryption attributes used to encrypt the data over an amount of encryptions (e.g., all encryptions; the last five encryptions, or any other suitable amount of encryptions), wherein each encryption identification number in the set of encryption identification numbers corresponds to a set of PQC encryption attributes used to encrypt the data at the time associated with the encryption identification number. In some embodiments, the data attribute generation circuitry 214 may be configured to generate a cryptographic spawn log comprising a timestamp and information indicative of the set of PQC encryption attributes used to encrypt the data. In some embodiments, the data attribute generation circuitry 214 may be configured to generate an updated cryptographic spawn log comprising a second timestamp and information indicative of a second set of PQC encryption attributes used to encrypt the data.

In some embodiments, the set of data attributes about the data may comprise a data access log indicative of a set of data activity monitoring information (e.g., database activity monitoring information, access credentials, user identification information, machine identification information) associated with electronic access to the data. For example, the data attribute generation circuitry 214 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In some embodiments, the set of data attributes about the data may comprise a determination that the data has been accessed. For example, the data attribute generation circuitry 214 may be configured to receive the determination that the data has been accessed from the data access monitoring circuitry 222.

In some embodiments, the set of data attributes about the data may comprise a data zone data attribute indicative of a data zone associated with the data. For example, the data attribute generation circuitry 214 may be configured to generate a data zone data attribute indicative of a data zone associated with the data, wherein the set of data attributes comprises the data zone data attribute. In some embodiments, the set of data attributes about the data may comprise a determination that the data has transitioned from a first data zone to a second data zone. For example, the data attribute generation circuitry 214 may be configured to receive the determination that the data has transitioned from a first data zone to a second data zone from the data zone monitoring circuitry 224.

The data envelope generation circuitry 216 includes hardware components designed or configured to request, receive, process, generate, and transmit data, data structures, control signals, and electronic information for use in PQC. In some embodiments, the data envelope generation circuitry 216 may be configured to generate a data envelope based on the set of data attributes. In some embodiments, the data envelope generation circuitry 216 may be configured to generate the data envelope based on the set of data attributes. In some embodiments, the data envelope may comprise the set of data attributes. In some embodiments, the data envelope generation circuitry 216 may be configured to generate the data envelope based on the set of data attributes, a risk profile data structure, any other suitable data, or any combination thereof. In some embodiments, the data envelope may comprise the set of data attributes, a risk profile data structure, any other suitable data, or any combination thereof. In some embodiments, each piece of data may have a data envelope, wherein the data envelope comprises one or more attributes about the data. In some embodiments, the data and its envelope may be referred to as a "data BLOB." In some instances, the data envelope will keep track of computing devices that accessed the data, such as computing devices that took an encrypted snapshot of the data and when that encrypted snapshot was taken.

The code testing circuitry 218 includes hardware components designed or configured to request, receive, process, generate, and transmit data, data structures, control signals, and electronic information. In some embodiments, the code testing circuitry 218 may be configured to run quantum optimization algorithms on one or more identified portions of code to improve the performance of the identified portions of code. In some embodiments, the identified portions of code may be related to QC based portfolio optimization, or other applicable applications. The quantum optimization algorithms may be algorithms based on one or more of Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like. In some embodiments, the code testing circuitry 218 may receive indications of the identified portions of code from the code identification circuitry 230.

The data monitoring circuitry 220 includes hardware components designed or configured to request, receive, process, generate, and transmit data, data structures, control signals, and electronic information for use in PQC. In some embodiments, the data monitoring circuitry 220 may be configured to monitor data, enveloped data structures, any other suitable data or electronic information, or any combination thereof. In this regard, the data monitoring circuitry 220 may include, for example, data access monitoring circuitry 222 and data zone monitoring circuitry 224.

In some embodiments, the data monitoring circuitry 220 may be configured to monitor an enveloped data structure and identify changes in the enveloped data structure. In some embodiments, the enveloped data structure may comprise a data envelope and data. In some embodiments, the data envelope may comprise a set of data attributes about the data and a risk profile data structure indicative of a vulnerability of the data in a PQC data environment. For example, the data monitoring circuitry 220 may be configured to generate an electronic indication of the change in the enveloped data structure, such as a control signal, metadata, or flag indicative of the change. In some embodiments, the data monitoring circuitry 220 may be configured to automatically monitor the enveloped data structure in real-time and without user interactivity; automatically identify the change in the enveloped data structure in real-time and without user interactivity; and generate the electronic indication of the change in the enveloped data structure in real-time and without user interactivity.

The data access monitoring circuitry 222 includes hardware components designed or configured to request, receive, process, generate, and transmit data, data structures, control signals, and electronic information for use in PQC. In some embodiments, the data access monitoring circuitry 222 may be configured to monitor the access of data, enveloped data structures, any other suitable data or electronic information, or any combination thereof. For example, the data access monitoring circuitry 222 may be configured to determine that the data has been accessed, generate a determination that the data has been accessed, and transmit the determination that the data has been accessed to any suitable circuitry, such as the data attribute generation circuitry 214.

In some embodiments, the data access monitoring circuitry 222 may be configured to generate a data access log indicative of a set of data activity monitoring information (e.g., database activity monitoring information, access credentials, user identification information, machine identification information) associated with electronic access to the data. For example, the data access monitoring circuitry 222 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the data access monitoring circuitry 222 may be configured to generate the set of data activity monitoring information and transmit the set of data activity monitoring information to the data attribute generation circuitry 214, which may be configured to receive the set of data activity monitoring information and generate a data access log based on the set of data activity monitoring information.

In some embodiments, the optimization factor filtering circuitry 226 includes hardware components designed or configured to request, receive, process, generate, and transmit data, data structures, control signals, and electronic information for use in QC based portfolio optimization. In some embodiments, the optimization factor filtering circuitry 226 may be configured to filter, based on pre-defined filtering criteria and/or one or more machine learning techniques, portfolio optimization factor data to generate filtered portfolio optimization factor data. In some embodiments, the optimization factor filtering circuitry 226 may retrieve portfolio optimization factor data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the portfolio optimization circuitry 228 includes hardware components designed or configured to request, receive, process, generate, and transmit data, data structures, control signals, and electronic information for use in QC based portfolio optimization. In some embodiments, the portfolio optimization circuitry 228 may be configured to optimize, based on real-time purchase data, real-time sell data, collateral expiration data, portfolio optimization factor data, filtered portfolio optimization factor data, life event data, personal portfolio factor data and/or one or more machine learning techniques to, optimize a portfolio. In some embodiments, the portfolio optimization circuitry 228 may retrieve real-time purchase data, real-time sell data, collateral expiration data, portfolio optimization factor data, life event data, personal portfolio factor data, or the like, from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the code identification circuitry 230 includes hardware components designed or configured to request, receive, process, generate, and transmit data, data structures, control signals, and electronic information for use in any application. In some embodiments, the code identification circuitry 230 may be configured to identify portions (e.g., runtime hotspots and targeted portions) of code that need to be optimized using QC. In some embodiments, the code identification circuitry 230 may retrieve data from a data storage device, such as memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, the code identification circuitry 230 may be configured to utilize application performance monitoring (APM) to evaluate code to find runtime hotspots (portions of code) and identify those runtime hotspots for QC (i.e., areas that would benefit the most from QC). In some embodiments, the code identification circuitry 230 may be running while the QC system is running to identify, in real-time, runtime hotspots for QC. Additionally, the code identification circuitry 230 may utilize a QC algorithm to identify the runtime hotspots. The QC algorithm used to identify the runtime hotspots may be algorithms based on one or more of Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like. In some embodiments, the code being optimized may be related to QC based portfolio optimization. In some embodiments, the code identification circuitry 230 may receive performance information of optimized identified runtime hotspot from the code testing circuitry 218 and may further identify runtime hotspots accordingly.

The algorithm performance circuitry 232 includes hardware components designed or configured to request, receive, process, generate, and transmit data, data structures, control signals, and electronic information for use in QC applications. In some embodiments, the algorithm performance circuitry 232 may be configured to retrieve performance information associated with a set of non-QC algorithms, a set of QC algorithms, or both. The algorithm performance circuitry 232 may store a catalog of QC algorithms and associated performance information.

The algorithm selection circuitry 234 includes hardware components designed or configured to request, receive, process, generate, and transmit data, data structures, control signals, and electronic information for use in QC applications. In some embodiments, the algorithm selection circuitry 234 may select one QC algorithm for each identified runtime hotspot. In some embodiments, the algorithm selection circuitry 234 may receive a catalog of QC algorithms and associated performance information from the algorithm performance circuitry 232 for selecting QC algorithms. In some embodiments, each QC algorithm may be defined to be associated with a distinct defined hardware.

The code performance evaluation circuitry 254 includes hardware components designed or configured to request, receive, process, generate, and transmit data, data structures, control signals, and electronic information for evaluating performance of QC or non-QC based code. In some embodiments, the code evaluation circuitry 254 may be configured to reverse engineer the code and perform static evaluation of the code. In some embodiments, the code performance evaluation circuitry 254 may compare the performance of the code with performance of one or more QC algorithms. In some embodiments, the code performance evaluation circuitry 254 may identify a hotspot type associated with the code.

The machine learning circuitry 252 includes hardware components designed or configured to request, receive, process, generate, and transmit data, data structures, control signals, and electronic information for utilizing one or more machine learning models to evaluate optimized identified code, such as by evaluating performance information of the optimized identified code, received from the code testing circuitry 218. The machine learning circuitry 252 may further receive human input regarding the optimized identified code.

The data storage circuitry 256 includes hardware components designed or configured to request, receive, process, generate, store, and transmit data, data structures, control signals, and electronic information for use in PQC. In some embodiments, the data storage circuitry 256 may be configured to store data (e.g., unencrypted data, encrypted data, decrypted data, re-encrypted data, double encrypted data, data access control information, bitstreams of data, links or pointers thereto), data attributes, data envelopes, enveloped data structures, policy information, non-QC algorithms, non-QC algorithm performance information, non-PQC encryption attributes, QC algorithm performance information, QC algorithms, any other suitable data or electronic information, or combinations thereof in a data storage device, a database management system, any other suitable storage device or system, or any combination thereof.

For example, the data storage circuitry 256 may be configured to store an enveloped data structure in a data storage device, a database management system, or a combination thereof. In some embodiments, the data storage circuitry 256 may be configured to store the data, data structures, control signals, and electronic information in the data storage device, the database management system, or both in real-time and without user interactivity.

In some embodiments, the data storage device may comprise, or be implemented as, memory 204, one or more of the one or more QC databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, the database management system may comprise, or be implemented as, a database management system (DBMS), such as a relational DMBS (RDBMS) data warehouse, a first non-relational DBMS (e.g., Hadoop distributed file system (HDFS), Hbase), a second non-relational DBMS (e.g., content management systems), a data visualization device, a data mart (e.g., online analytical processing (OLAP) cube), a real-time analytical RDBMS, any other suitable device or circuitry, or a combination thereof. In some embodiments, the data storage device, the database management system, or both may comprise, or be implemented as, one or more decentralized storage devices, such as a cloud storage device or system.

The UI circuitry 258 includes hardware components designed or configured to generate graphical user interface (GUI) data configured to be displayed by a display device. For instance, the UI circuitry 258 may include hardware components designed or configured to generate GUI data based on any embodiment or combination of embodiments. In some embodiments, the UI circuitry 258 may be configured to generate GUI data and transmit the generated GUI data to the input-output circuitry 206, and the input-output circuitry 206 may be configured to receive the GUI data and display the received GUI data on one or more display screens.

It should also be appreciated that, in some embodiments, each of the data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, portfolio optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258, may include one or more separate processors, specially configured field programmable gate array (FPGA), ASIC, or cloud utilities to perform the above functions.

In some embodiments, the hardware components described above with reference to data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, portfolio optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258, may, for instance, communications circuitry 208, or any suitable wired or wireless communications path to communicate with a node device, a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, or any other suitable circuitry or device.

In some embodiments, one or more of the data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, portfolio optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258 may be hosted locally by the apparatus 200.

In some embodiments, one or more of the data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, portfolio optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258 may be hosted remotely (e.g., by one or more cloud servers) and thus need not physically reside on the apparatus 200. Thus, some or all of the functionality described herein may be provided by a third-party circuitry. For example, the apparatus 200 may access one or more third-party circuitries via a networked connection configured to transmit and receive data and electronic information between the apparatus 200 and the third-party circuitries. In turn, the apparatus 200 may be in remote communication with one or more of data attribute generation circuitry 214, data envelope generation circuitry 216, code testing circuitry 218, data monitoring circuitry 220, data access monitoring circuitry 222, data zone monitoring circuitry 224, optimization factor filtering circuitry 226, portfolio optimization circuitry 228, code identification circuitry 230, algorithm performance circuitry 232, algorithm selection circuitry 234, machine learning circuitry 252, code performance evaluation circuitry 254, data storage circuitry 256, and UI circuitry 258.

Although some of these components of apparatus 200 are described with respect to their functional capabilities, it should be understood that the particular implementations necessarily include the use of particular hardware to implement such functional capabilities. It should also be understood that certain of these components may include similar or common hardware. For example, two sets of circuitries may both leverage use of the same processor, network interface, quantum communications interface, optoelectronic components, storage medium, machine learning circuitry, or the like to perform their associated functions, such that duplicate hardware is not required for each set of circuitries. It should also be appreciated that, in some embodiments, one or more of these components may include a separate processor, specially configured FPGA, ASIC, or cloud utility to perform its corresponding functions as described herein.

The use of the term "circuitry" as used herein with respect to components of apparatus 200 includes particular hardware configured to perform the functions associated with respective circuitry described herein. While the term "circuitry" should be understood broadly to include hardware, in some embodiments, circuitry may also include software for configuring the hardware. For example, in some embodiments, "circuitry" may include processing circuitry, storage media, network interfaces, quantum interfaces, input-output devices, optoelectronic components, and other components. In some embodiments, other elements of apparatus 200 may provide or supplement the functionality of particular circuitry. For example, the processing circuitry 202 may provide processing functionality, memory 204 may provide storage functionality, classical communications circuitry 210 may provide network interface functionality, and quantum communications circuitry 212 may provide quantum interface functionality among other features.

In some embodiments, various components of one or more of the apparatus 200 may be hosted remotely (e.g., by one or more cloud servers) and thus need not physically reside on the corresponding apparatus 200. Thus, some or all of the functionality described herein may be provided by third-party circuitry. For example, a apparatus 200 may access one or more third-party circuitries via any sort of networked connection that facilitates transmission of data and electronic information between the apparatus 200 and the third-party circuitries. In turn, that apparatus 200 may be in remote communication with one or more of the other components described above as being comprised by the apparatus 200.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions, any other type of code described herein, and any combination thereof may be loaded onto a computer, processor or other programmable apparatus's circuitry to produce a machine, such that the computer, processor, or other programmable circuitry that executes the code on the machine creates the means for implementing various functions, including the functions described herein.

The one or more server devices 110A-110N, one or more client devices 112A-112N, one or more database server devices 114, and one or more remote server devices 116 described with reference to FIG. 1 may be embodied by one or more computing devices, servers, data storage devices, or systems that also may include processing circuitry, memory, input-output circuitry, and communications circuitry. For example, a server device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a client device 112 may be a smartphone on which an app (e.g., a mobile database app) is running or otherwise being executed by processing circuitry. As it relates to operations described in the present disclosure, the functioning of these devices may utilize components similar to the similarly named components described above with reference to FIG. 2. Additional description of the mechanics of these components is omitted for the sake of brevity. These device elements, operating together, provide the respective computing systems with the functionality necessary to facilitate the communication of data with the PQC system described herein.

Having described specific components of example devices and circuitries involved in various embodiments contemplated herein, example procedures for QC based code optimization are described below in connection with FIGS. 3-4.

Example Operations

Figure 3:
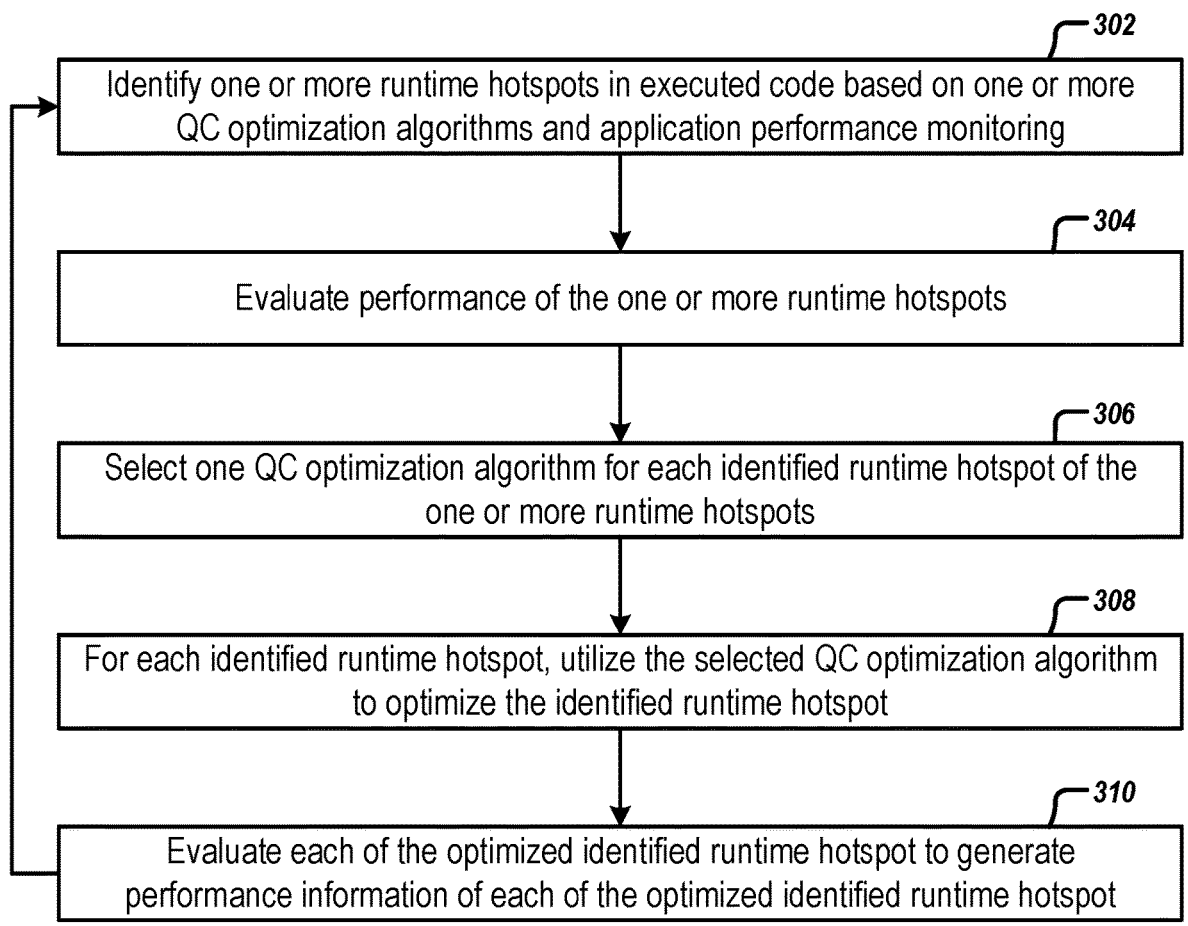
FIG. 3 illustrates example flowchart for optimizing code based on QC algorithms in accordance with some example embodiments described herein.

FIG. 3 illustrates an example flowchart 300 that contains example operations for generating an enveloped data structure in accordance with some example embodiments described herein. The operations illustrated in FIG. 3 may, for example, be performed by one or more components described with reference to QC system 102 shown in FIG. 1; by a server device 110, a client device 112, a database server device 114, or a remote server device 116 in communication with QC system 102; by apparatus 200 shown in FIG. 2; or by any combination thereof. In some embodiments, the various operations described in connection with FIG. 3 may be performed by the apparatus 200 by or through the use of one or more of processing circuitry 202, memory 204, input-output circuitry 206, communications circuitry 208 (including, but not limited to, classical communications circuitry 210 and quantum communications circuitry 212), data attribute generation circuitry 214, data envelope generation circuitry 216, code testing circuitry 218, data monitoring circuitry 220 (including, but not limited to, data access monitoring circuitry 222 and data zone monitoring circuitry 224), optimization factor filtering circuitry 226, portfolio optimization circuitry 228, code identification circuitry 230, algorithm performance circuitry 232, algorithm selection circuitry 234, machine learning circuitry 252, code performance evaluation circuitry 254, data storage circuitry 256, user interface (UI) circuitry 258, any other suitable circuitry, and any combination thereof.

As shown by operation 302, the apparatus 200 includes means, such as code identification circuitry 230 or the like, for identifying one or more runtime hotspots in executed code based on one or more QC algorithms and application performance monitoring. In some embodiments, the executed code may be code related to QC based portfolio optimization. In some embodiments, the executed code may be provided to the code identification circuitry in the form of runtime hotspots and the code identification circuitry may be configured to identify one or more runtime hotspots, among the provided runtime hotspots, for further processing based on one or more QC algorithms and application performance monitoring.

The one or more QC algorithms may be one or more of, for example, Quadratic Unconstrained Binary Optimization "QUBO", Quantum Approximate Optimization Algorithm "QAOA", Quantum Machine Learning "QML", Quantum Geometrodynamics "QGD", Quantum Monte Carlo "QMC", Harrow, Hassidim and Lloyd "HHL", or the like, executed on a particular QC machine (e.g., quantum annealer, circuit-based quantum processor, or the like).

As shown by operation 304, the apparatus 200 includes means, such as code performance evaluation circuitry 254 or the like, for evaluating performance of the one or more runtime hotspots. Performance may include one or more of: a processing time, a CPU utilization, a memory utilization, or the like. The evaluated performance may be stored as performance information. In some embodiments, the performance evaluation circuitry 256 may compare the performance of each of the one or more runtime hotspots with performance of one or more QC algorithms received from algorithm performance circuitry 232.

As shown by operation 306, the apparatus 200 includes means, such as algorithm selection circuitry 234 or the like, for selecting one QC algorithm for each identified runtime hotspot of the one or more identified runtime hotspots. In some embodiments, the algorithm selection circuitry 234 may receive results of comparing the performance of each of the one or more runtime hotspots with performance of one or more QC algorithms from the code performance evaluation circuitry 254 and may select QC algorithm for each identified runtime hotspot accordingly.

As shown by operation 308, the apparatus 200 includes means, such as code testing circuitry 218 or the like, for utilizing the selected QC optimization algorithm to optimize the identified runtime hotspot for each identified runtime hotspot.

As shown by operation 310, the apparatus 200 includes means, such as code testing circuitry 218 or code performance evaluation circuitry 254 or the like, for evaluating each of the optimized identified runtime hotspot to generate performance information of each of the optimized identified runtime hotspot. The performance information of each of the optimized identified runtime hotspot may be used by the code identification circuitry 230 or the like, for further identifying one or more runtime hotspots in executed code based on one or more QC. In some embodiments, the apparatus 200 further includes means, such as the machine learning circuitry 254 or the like, for evaluating each of the optimized identified runtime hotspot. The machine learning circuitry 254 may be configured to receive the performance information and may further receive human input with regard to the optimized identified runtime hotspot.

In some embodiments, operations 302, 304, 306, 308, and 310, may not necessarily occur in the order depicted in FIG. 3.

FIG. 3 thus illustrates flowchart describing the operation of various systems (e.g., QC system 102 described with reference to FIG. 1), apparatuses (e.g., apparatus 200 described with reference to FIG. 2,), methods (e.g., flowchart 300 described with reference to FIG. 3), and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 3 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the QC system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for quantum computing (QC) based code-optimization, the system comprising:
   code identification circuitry configured to:
     receive an indication of one or more runtime hotspots in executed code based on one or more QC algorithms;
   code testing circuitry configured to:
     test a portion of the executed code associated with at least one of the one or more identified runtime hotspots; and
     generate a plurality of performance information indicators comprising information resulting from the testing of the portion of the code;
   algorithm selection circuitry configured to:
     receive a catalog of QC algorithms and associated performance information;
     select, based on the plurality of performance information indicators, one QC algorithm for the at least one of the one or more identified runtime hotspots; and utilize the selected QC algorithm for the at least one of the one or more identified runtime hotspots to optimize the at least one of the one or more identified runtime hotspots.

2. The system of claim 1, wherein the system further comprises: code performance evaluation circuitry configured to evaluate performance of the one or more runtime hotspots by reverse engineering.

3. The system of claim 2, wherein evaluating the performance of the one or more runtime hotspots includes comparing performance of the one or more runtime hotspots to one or more QC algorithms.

4. The system of claim 2, wherein the code performance evaluation circuitry is further configured to evaluate each of the optimized identified runtime hotspot to generate performance information of each of the optimized identified runtime hotspot.

5. The system of claim 4, wherein the code identification circuitry is further configured to receive the performance information of each of the optimized identified runtime hotspot to further identify runtime hotspots.

6. A method for quantum computing (QC) based code-optimization, the method comprising:
receiving an indication of one or more runtime hotspots in executed code based on one or more QC algorithms;
testing a portion of the executed code associated with at least one of the one or more identified runtime hotspots;
generating a plurality of performance information indicators comprising information resulting from the testing of the portion of the code;
receiving a catalog of QC algorithms and associated performance information;
selecting, based on the plurality of performance information indicators, one QC algorithm for the at least one of the one or more identified runtime hotspots; and
utilizing the selected QC algorithm for the at least one of the one or more identified runtime hotspots to optimize the at least one of the one or more identified runtime hotspots.

7. The method of claim 6, further comprising evaluating performance of the one or more runtime hotspots by reverse engineering.

8. The method of claim 7, wherein evaluating performance of the one or more runtime hotspots includes comparing performance of the one or more runtime hotspots to one or more QC algorithms.

9. The method of claim 6, further comprising evaluating each of the optimized identified runtime hotspot to generate performance information of each of the optimized identified runtime hotspot.

10. The method of claim 9, further comprising receiving the performance information of each of the optimized identified runtime hotspot to further identify runtime hotspots.

11. A computer program product, the computer program product comprising at least one non-transitory computer-readable storage medium storing program instructions that, when executed, cause a system to:
receive an indication of one or more runtime hotspots in executed code based on one or more quantum computing (QC) algorithms;
test a portion of the executed code associated with at least one of the one or more identified runtime hotspots;
generate a plurality of performance information indicators comprising information resulting from the testing of the portion of the code;
receive a catalog of QC algorithms and associated performance information;
select, based on the plurality of performance information indicators, one QC algorithm for the at least one of the one or more identified runtime hotspots; and
utilize the selected QC algorithm for the at least one of the one or more identified runtime hotspots to optimize the at least one of the one or more identified runtime hotspots.

12. The computer program product of claim 11, wherein the program instructions, when executed, further cause the system to evaluate performance of the one or more runtime hotspots by reverse engineering.

13. The computer program product of claim 12, wherein evaluating performance of the one or more runtime hotspots includes comparing performance of the one or more runtime hotspots to one or more QC algorithms.

14. The computer program product of claim 11, wherein the program instructions, when executed, further cause the system to evaluate each of the optimized identified runtime hotspot to generate performance information of each of the optimized identified runtime hotspot.

15. The computer program product of claim 11, wherein the program instructions, when executed, further cause the system to receive the performance information of each of the optimized identified runtime hotspot to further identify runtime hotspots.

16. The computer program product of claim 11, wherein the performance information includes one or more of: a processing time, a central processing unit utilization, or a memory utilization.

17. The computer program product of claim 11, wherein the one or more QC algorithms include one or more of: a Quadratic Unconstrained Binary Optimization algorithm, a Quantum Approximate Optimization algorithm, a Quantum Machine Learning algorithm, a Quantum Geometrodynamics algorithm, or a Quantum Monte Carlo algorithm.

* * * * *